United States Patent
Carletti et al.

(10) Patent No.: US 9,444,331 B2
(45) Date of Patent: Sep. 13, 2016

(54) SYSTEM AND METHOD FOR A CONVERTER CIRCUIT

(71) Applicant: Infineon Technologies AG, Neubiberg (DE)

(72) Inventors: Andrea Carletti, Munich (DE); Mathias Kiele-Dunsche, Neubiberg (DE)

(73) Assignee: Infineon Technologies AG, Neubiberg (DE)

( * ) Notice: Subject to any disclaimer, the term of this patent is extended or adjusted under 35 U.S.C. 154(b) by 280 days.

(21) Appl. No.: 13/953,301

(22) Filed: Jul. 29, 2013

(65) Prior Publication Data

US 2015/0028836 A1 Jan. 29, 2015

(51) Int. Cl.
*G05F 1/00* (2006.01)
*H02M 3/156* (2006.01)
*H02M 3/04* (2006.01)
*H02M 3/155* (2006.01)

(52) U.S. Cl.
CPC .............. *H02M 3/156* (2013.01); *H02M 3/04* (2013.01); *H02M 3/155* (2013.01)

(58) Field of Classification Search
USPC ............... 323/207, 222, 223, 271, 282–285; 363/80, 82, 89, 90
See application file for complete search history.

(56) References Cited

U.S. PATENT DOCUMENTS

| | | | | |
|---|---|---|---|---|
| 5,070,294 A | * | 12/1991 | Nochi | H02M 3/33561 323/267 |
| 6,452,369 B1 | * | 9/2002 | Lang | H02J 7/0029 323/285 |
| 7,068,020 B2 | * | 6/2006 | Inagawa et al. | 323/282 |
| 8,093,873 B2 | * | 1/2012 | Kiamilev | G05F 1/67 323/222 |
| 8,217,636 B2 | | 7/2012 | Khayat et al. | |
| 8,278,892 B2 | | 10/2012 | Friebe et al. | |
| 2005/0156582 A1 | * | 7/2005 | Redl | H02M 3/156 323/282 |
| 2005/0169017 A1 | | 8/2005 | Muegge et al. | |
| 2010/0019809 A1 | * | 1/2010 | Hwang et al. | 327/129 |
| 2010/0033146 A1 | | 2/2010 | Irissou et al. | |
| 2011/0140678 A1 | | 6/2011 | Yee | |
| 2013/0106383 A1 | | 5/2013 | Kurokawa et al. | |

FOREIGN PATENT DOCUMENTS

DE 69213187 T2 1/1997

OTHER PUBLICATIONS

"Low-Cost 100 mA High-Voltage Buck and Buck-Boost Using NCP1052," AND8098/D, On Semiconductor, Jun. 2003, 10 pages.

* cited by examiner

*Primary Examiner* — Nguyen Tran
(74) *Attorney, Agent, or Firm* — Slater Matsil, LLP

(57) ABSTRACT

In accordance with an embodiment, a circuit includes a switch coupled between a first reference terminal and a first output terminal, an inductive element coupled between an input terminal and a second output terminal, and a diode coupled between the first output terminal and the input terminal. The circuit further includes a controller coupled to a control terminal of the switch. The controller is configured to determine a switching signal based on an output signal at the second output terminal and provide the switching signal to the control terminal of the switch.

24 Claims, 14 Drawing Sheets

Figure 1 – Prior Art

SYSTEM AND METHOD FOR A CONVERTER CIRCUIT

TECHNICAL FIELD

The descriptions, embodiments, and applications described herein relate generally to a system and method for supplying electrical loads, and more particularly to a system and method for a converter circuit.

BACKGROUND

Power supply systems are pervasive in many electronic applications from computers to automobiles. Generally, voltages within a power supply system are generated by performing a DC-DC, DC-AC, and/or AC-DC conversion by operating a switch loaded with an inductor or transformer. One class of such systems includes switched mode power supplies (SMPS). An SMPS is usually more efficient than other types of power conversion systems because power conversion is performed by controlled charging and discharging of the inductor or transformer and reduces energy lost due to power dissipation across resistive voltage drops.

Specific topologies for SMPS comprise buck converters, boost converters, and flyback converters, among others. Both buck and boost converters typically make use of an inductor whereas a flyback converter isolates a load and may multiply the voltage conversion ratio through the use of a transformer. Component selection and circuit design become increasingly important when SMPS are used in high voltage applications.

One issue that arises with respect to operating SMPS in high voltage applications is cost. Due to the various positive attributes of SMPS, they are often used as converter circuits in high voltage applications, but the cost of the circuit increases when the voltage is higher. As the voltage increases, issues arise with driving the switch and isolating various components. Some systems address these issues by using a type of device that can withstand high voltages and using boosting circuits to drive these high voltage devices.

SUMMARY OF THE INVENTION

In accordance with an embodiment, a circuit includes a switch coupled between a first reference terminal and a first output terminal, an inductive element coupled between an input terminal and a second output terminal, and a diode coupled between the first output terminal and the input terminal. The circuit further includes a controller coupled to a control terminal of the switch. The controller is configured to determine a switching signal based on an output signal at the second output terminal and provide the switching signal to the control terminal of the switch.

BRIEF DESCRIPTION OF THE DRAWINGS

For a more complete understanding, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of various embodiments are discussed in detail below. It should be appreciated, however, that the various embodiments described herein are applicable in a wide variety of specific contexts. The specific embodiments discussed are merely illustrative of specific ways to make and use various embodiments, and should not be construed in a limited scope.

Description is made with respect to various embodiments in a specific context, namely in power converter circuits. Various embodiments described herein include AC or DC to DC voltage converters, motor driving circuits, battery charging circuits, and buck converter circuits. In other embodiments, aspects may also be applied to other applications involving any type of converter or load driving circuits using integrated or discrete components according to any fashion of electronics as known in the art.

Figure 1:
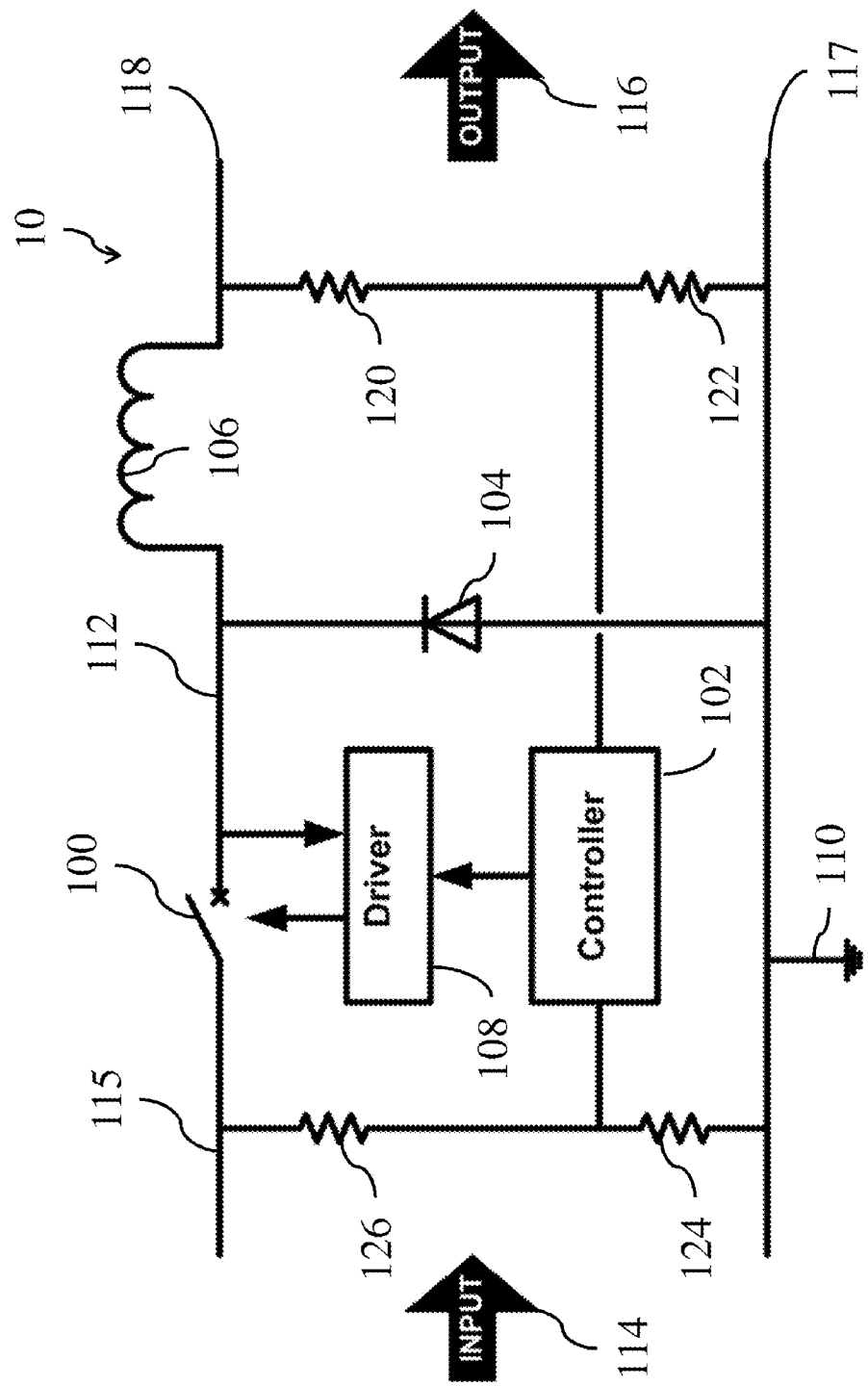
FIG. 1 illustrates a schematic of a conventional converter circuit.

With reference now to FIG. 1, a conventional converter circuit 10 is shown. The converter circuit 10 includes a switch 100 connected to a driver 108 which is further connected to a controller 102. The controller 102 is connected to resistor 126 and resistor 124, which form a first voltage divider across input 114. The controller 102 is also connected to resistor 120 and resistor 122, which form a second voltage divider across output 116. The converter circuit 10 also includes a diode 104 connected between a node 110 and a node 112. As depicted, inductor 106 is connected between node 112 and an output terminal 118.

Switch 100 is connected between an input terminal 115 and node 112 and is floating. The switch 100 receives a control signal from driver 108, which receives an original control signal from controller 102. In the conventional art, node 110 is a ground node (low). For higher voltage applications in the conventional art, the driver 108 is isolated and may use a floating power supply.

Figure 2:
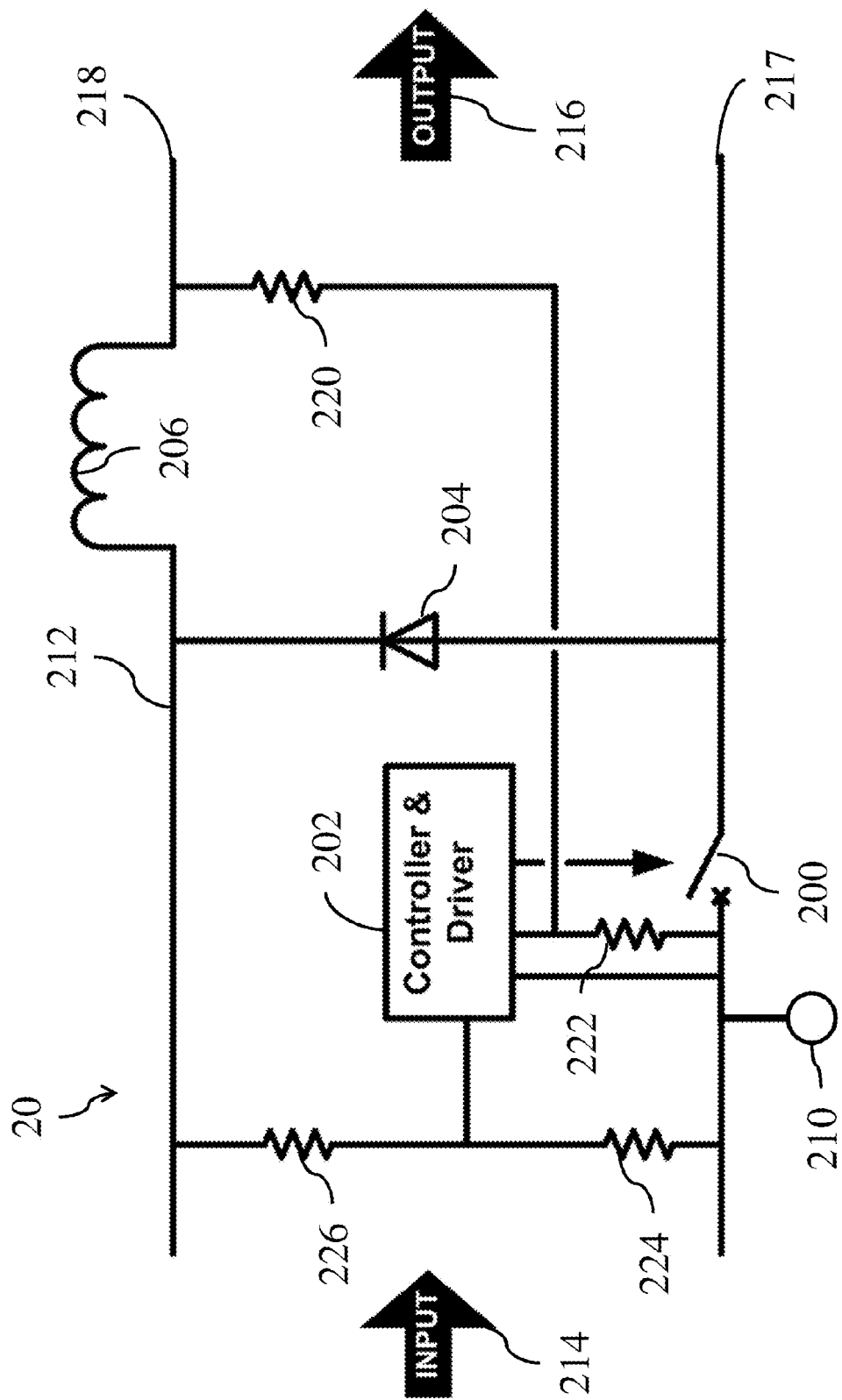
FIG. 2 illustrates a schematic of an embodiment converter circuit.

FIG. 2 illustrates converter circuit 20 according to an embodiment of the present invention. Converter circuit 20 includes a switch 200, a controller and driver 202, a diode 204, and an inductor 206. According to an embodiment, switch 200 is connected between a node 210 and an output terminal 217. Switch 200 may receive a control signal from controller 202, operable to open and close switch 200. In some embodiments controller 202 is connected to resistor 220, resistor 222, resistor 224, and resistor 226. In various embodiments, resistors 220, 222, 224, and 226 may include numerous other resistors and may be implemented as voltage dividers. As depicted in the embodiment shown in FIG. 2, resistors 220 and 222 form a voltage divider across output terminal 218 and node 210 while resistors 224 and 226 form a voltage divider across node 212 and node 210. In other embodiments resistors 220, 222, 224, and 226 may be connected to other specific nodes and form other measurement circuits. For example, resistors 220 and 222 may be connected across output terminal 218 and output terminal 217.

In further reference to FIG. 2, node 210 is a reference node in specific embodiments and switch 200 is connected between the reference node 210 and output terminal 217. According to an embodiment, both switch 200 and controller 202 share reference node 210. Node 210 is used as the reference voltage for Controller 202. When switch 200 is closed, output terminal 217 is connected to reference node 210. When switch 200 is opened, output terminal 217 is floating with respect to reference node 210. According to an embodiment, a load connected to output 216 across output terminals 217 and 218 does not have a separate reference ground node. In some embodiments, reference node 210 may be referenced to nodes other than ground, while in other embodiments reference node 210 may be referenced to ground.

According to various embodiments, switch 200 may be implemented using various known switching devices. Switch 200 may comprise a transistor, such as a bipolar junction transistor (BJT), an insulated-gate junction transistor (IGBT), a field effect transistor (FET), such as a junction field effect transistor (JFET), or a metal oxide semiconductor FET (MOSFET), made using fabrication processes known in the art. Switch 200 may include any types of materials used for transistors. Such variations of transistor type and material may be included in various embodiments described herein.

According to various embodiments, controller 202 may be implemented using an application specific integrated circuit (ASIC). Controller 202 may be implemented as a fully custom fabricated IC, a digitally programmed ASIC, or a microcontroller in various embodiments. In other embodiments, controller 202 may comprise an analog control circuit and/or discrete digital and/or analog components.

According to an embodiment, during operation, controller 202 repeatedly generates control signals operable to open and close switch 200. When switch 200 is closed, a load connected to output 216 conducts current through inductor 206 and output terminal 218 with a return path through output terminal 217 and switch 200 to node 210. Thus, when switch 200 is closed, inductor 206 is charged as the current increases. According to various embodiments, input 214 supplies an AC or DC voltage or a supply current. When switch 200 is opened, the return path to node 210 is broken. Inductor 206 maintains a current flowing to output terminal 218. A return current passes through output terminal 217 and, because switch 200 is open, a voltage on output terminal 217 increases in order to forward bias diode 204. Thus, when switch 200 is opened, current continues to conduct through inductor 206, through a load connected to output 216, and through diode 204.

Figure 3:
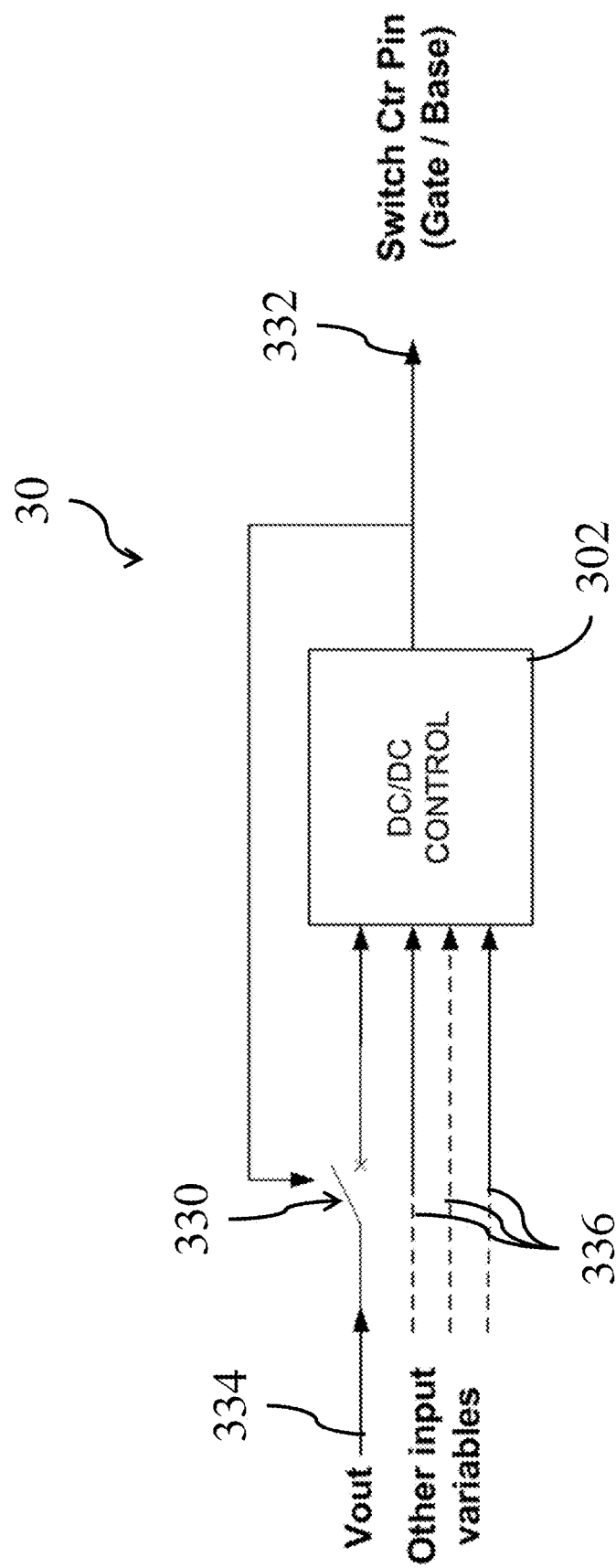
FIG. 3 illustrates a block diagram of an embodiment controller circuit.

For further description, FIG. 3 depicts an embodiment control circuit 30. The control circuit 30 includes a controller 302 which is configured to supply a control signal to a control pin 332 of a switch (not shown). In an embodiment, control circuit 30 may be included in FIG. 2 in the place of controller 202. Controller 302 has inputs 336 for receiving various input signals and is configured to measure an output condition such as a voltage and/or a current. According to the embodiment shown, controller 302 receives a signal Vout 334 through a switch 330, which is controlled by control signal on control pin 332. In accordance with an embodiment as described with reference to FIG. 2, controller 302 repeatedly generates a control signal on control pin 332 to open and close a switch (switch 200 in some embodiments). The control signal on control pin 332 simultaneously opens and closes switch 330. Controller 302 measures the signal Vout 334 when both switch 330 and an external switch (switch 200 in some embodiments) are closed. According to an embodiment, an output condition is only measured when switch 330 is closed. In some embodiments, the switch 330 in FIG. 3 and the switch 200 in FIG. 2 are combined into a single switch. In the depicted embodiment, signal Vout 334 is a voltage. Alternatively, a current may be used in addition to or instead of a voltage.

According to an embodiment, during operation, the controller (302 or 202) measures an output condition when a switch (330 and/or 200) is closed and/or in a conducting state. In various embodiments, the output condition is used by the controller (302 or 202) as a feedback signal to further control the output condition. In an embodiment, converter circuit 20 is operated as a buck converter where switch 200 is closed to charge inductor 206. An output voltage is measured by controller 202 (or 302) across output terminals 218 and 217 through resistors 220 and 222 when switch 200 is closed. Switch 200 is consequently opened and inductor 206 continues to maintain a voltage supply to output 216. Controller 202 (or 302) is configured to receive the measured output voltages over repeated open and close cycles and use the measured output voltages to adjust the duration of time switch 200 is opened and/or closed. In one embodiment, controller 202 (or 302) provides a pulse width modulated (PWM) control signal to switch 200 and uses the measured output condition as feedback to adjust the pulse width and thereby control the output condition. In another embodiment, controller 202 (or 302) provides a pulse frequency modulated (PFM) control signal to switch 200 and uses the measured output condition as feedback to adjust the pulse frequency and thereby control the output condition.

According to various embodiments, controller 202 (or 302) may use various alternative methods to process an output condition and regulate the opened and closed time. In an embodiment where the output condition is a voltage, the controller 202 (or 302) may average the output voltage over a plurality of cycles and modify the opened and closed duration to regulate the output voltage. As a specific example, converter circuit 20 may be operated to convert a 400 V DC signal on input 214 to a 200 V DC signal on output 216 across output terminals 218 and 217. Controller 202 repeatedly measures the output condition (voltage) when switch 200 is closed and modifies how long a time to keep switch 200 closed or open to better regulate the output condition at 200 V. In some embodiments, closing the switch 200 for a longer time increases the voltage at the output and opening the switch 200 for a longer time decreases the voltage. Alternatively the output condition is measured as a current and regulated as a current.

According to various embodiments, the system cost may be reduced because fewer components are needed, a controller may drive a switch without the addition of an isolated driver and a floating power supply, and a controller may drive a switch even during high voltage operation of the switch. In some cases, the driver and the controller may be combined into a less costly component.

According to an embodiment, a controller may drive a switch without an isolated driver and/or a floating power supply. For example, connecting a switch and a controller to a common reference node prevents the switch from being floating with respect to the controller. In some embodiments, the switch is not floating with respect to the controller while the output voltage is being measured. Because the switch is not floating, an isolated driver for driving the switch and/or a floating power supply for driving the switch are not necessary in some cases. In such embodiments, system cost may be reduced when a floating power supply and an isolated driver are not used. In another embodiment, a controller may easily drive a switch even in the case of high voltage operation.

Figure 4A:
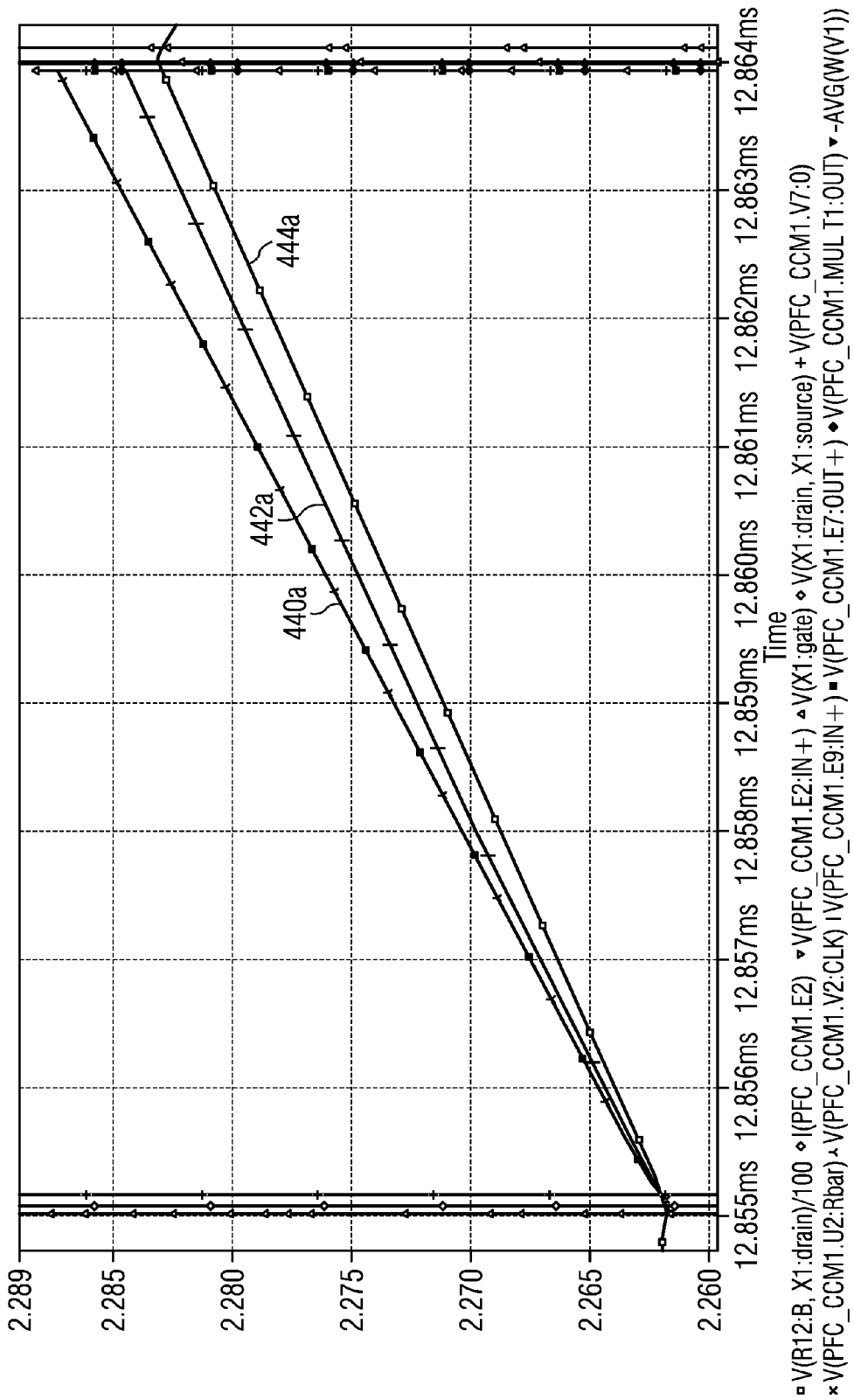
FIGS. 4a-b illustrate waveform diagrams of an embodiment system.
Figure 4B:
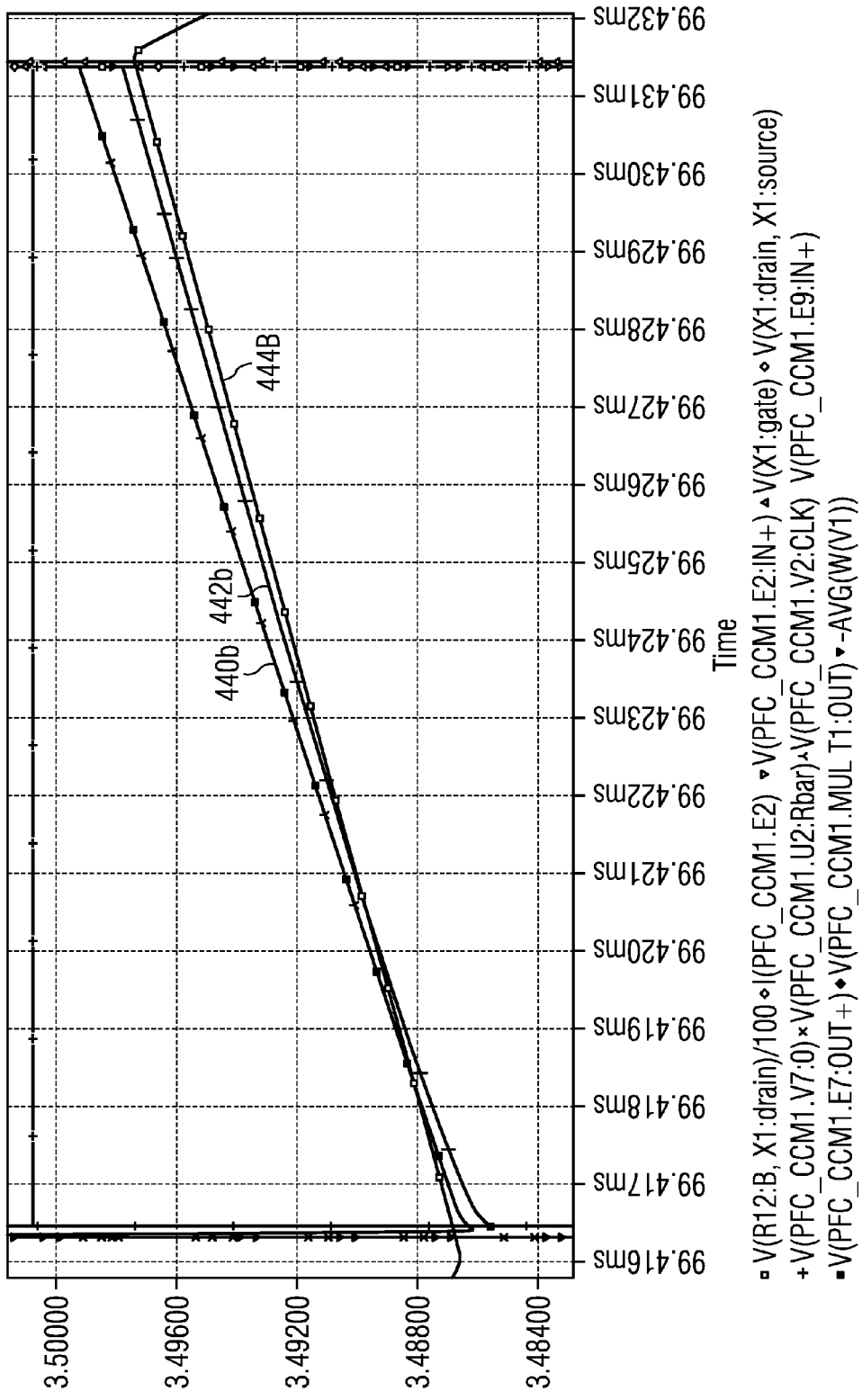

FIGS. 4a-b illustrate waveform diagrams of embodiment converter circuits. FIG. 4a illustrates a waveform diagram of a voltage output signal according to an embodiment buck converter with an input of 400 V DC and a target output of 200 V DC. Waveform 444a depicts an actual output voltage of the buck converter; waveform 440a depicts a measured output voltage by a controller; and waveform 442a depicts the measured output voltage after correcting for a calculated voltage drop across a switch (i.e. switch 200 in FIG. 2). As is illustrated by the waveforms, some error exists in the measured output voltage received by the controller. As shown, various methods of correction may increase the accuracy of the measurement.

FIG. 4b illustrates a waveform diagram of a voltage output signal according to an embodiment buck converter with an input of 400 V DC and a target output of 350 V DC. Waveforms 444b, 440b, and 442b depict the actual output voltage, the measured output voltage, and the measured and corrected output voltage, respectively. In an embodiment, the corrected output voltage 442b is obtained by subtracting a voltage drop across a switch (i.e. switch 200 in FIG. 2). The voltage drop across the switch may be obtained in various embodiments by measurement, estimation, or more accurate calculation. In this case, the waveforms illustrate that the accuracy of the output voltage measured by the controller is increased at higher voltages according to some embodiments. According to some embodiments, the output measurement accuracy when converting from 400 V to 200 V is less than the output measurement accuracy when converting from 400 V to 350 V.

Figure 5A:
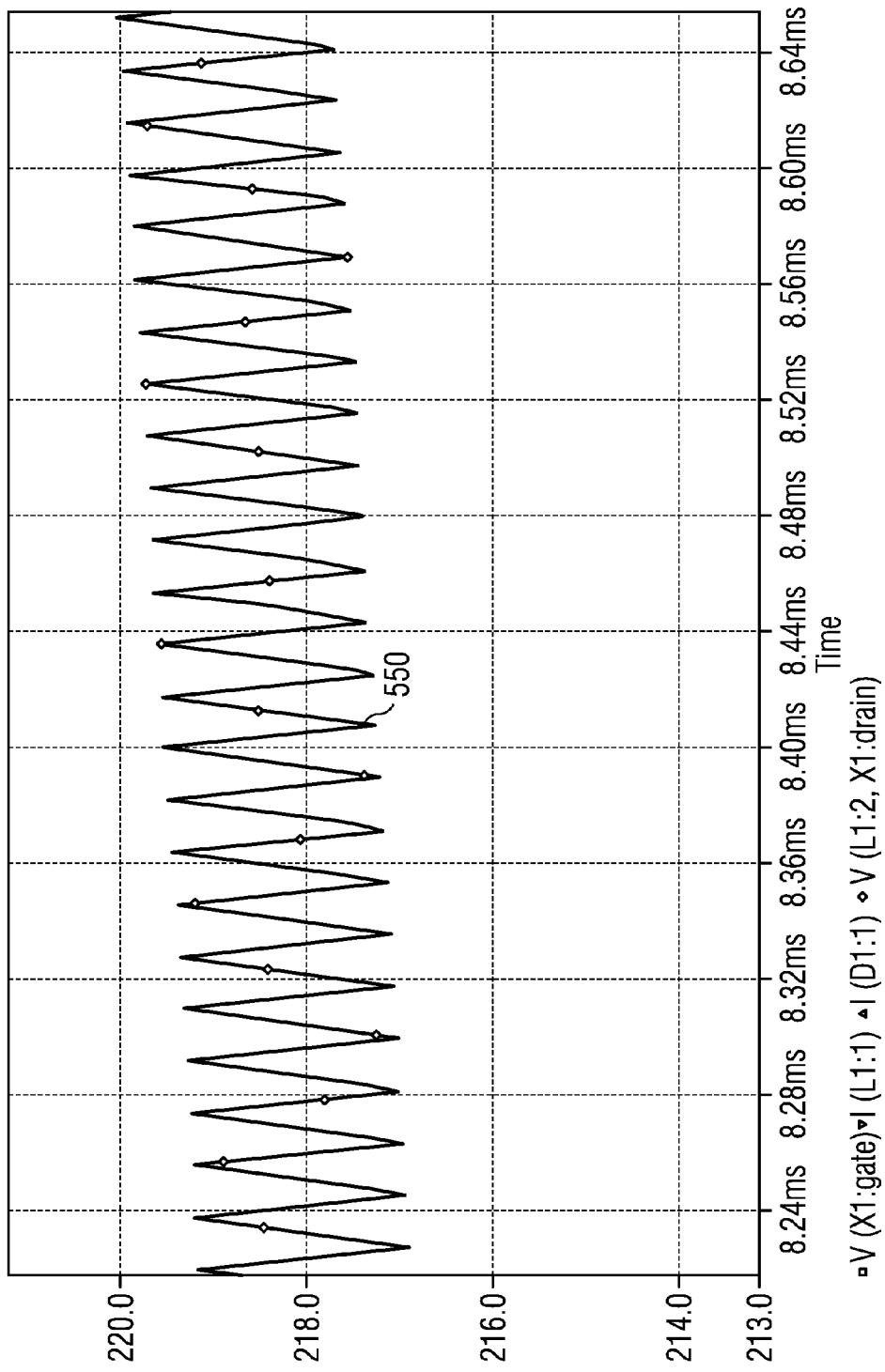
FIGS. 5a-b illustrate waveform diagrams of an embodiment system.
Figure 5B:
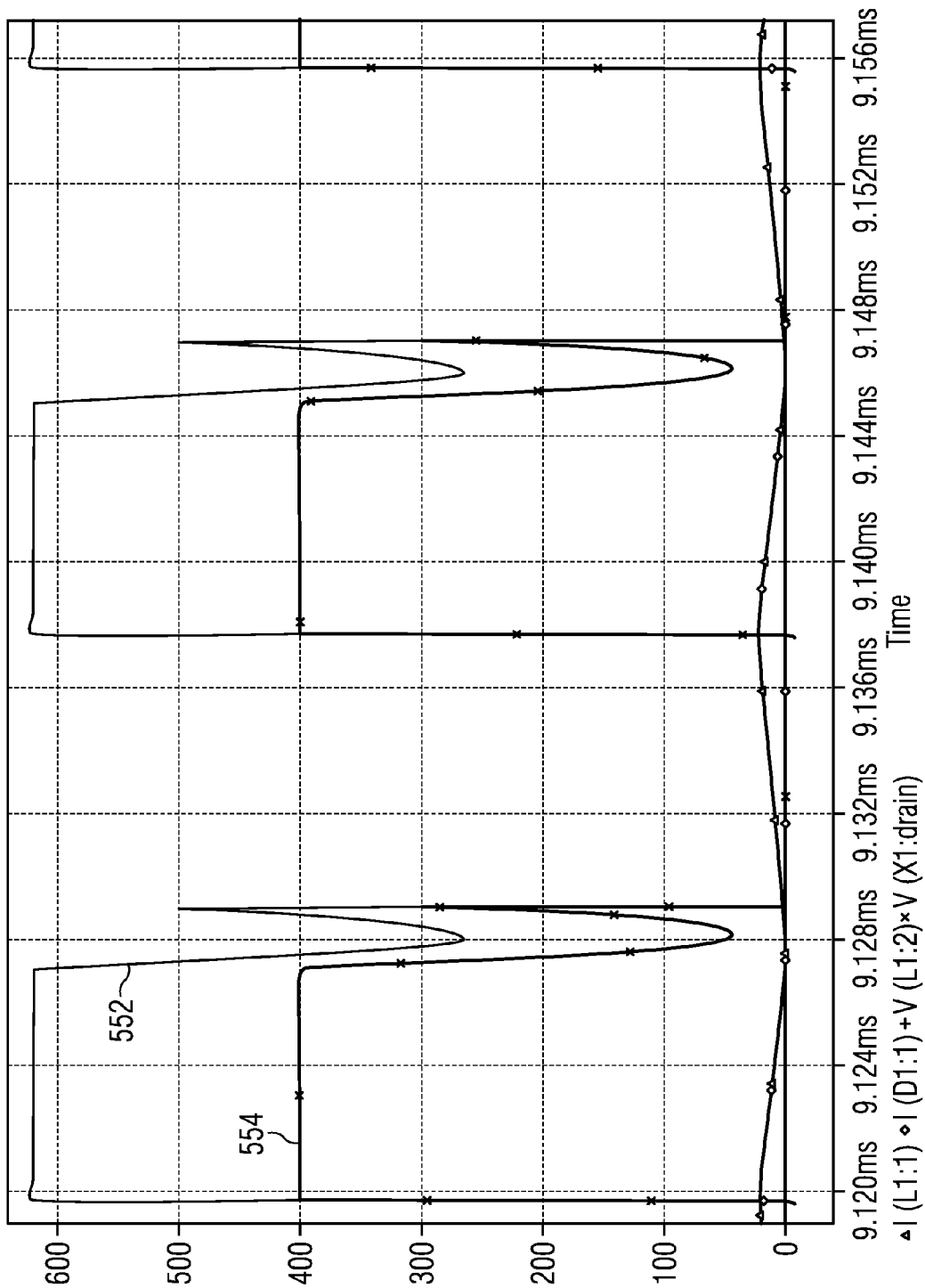

FIGS. 5a-b illustrate waveform diagrams showing output voltages of an embodiment system. FIG. 5a illustrates a voltage waveform 550 across a load that shows a small amount of output voltage ripple in accordance with the opening and closing of a switch (such as switch 200 in FIG. 2). FIG. 5b illustrates two voltage waveforms showing a low output terminal waveform 554 and a high output terminal waveform 552 that illustrate how the output voltage terminals are floating with respect to a reference node (such as reference node 210 in FIG. 2) when a switch (such as switch 200 in FIG. 2) is opened, as can be seen by a large voltage swing. Waveform 550 represents the voltage difference between waveforms 552 and 554. Waveform 550 illustrates an output voltage difference across the output terminals while waveforms 552 and 554 represent node voltages with respect to the reference node (such as reference node 210 in FIG. 2). FIGS. 5a-b illustrate that the output voltage difference across the output terminals remains stable even though the output terminals are floating and experience large voltage swings with respect to the reference node (such as reference node 210 in FIG. 2). In this case a relatively stable differential voltage is maintained in the presence of common mode voltage swings.

Figure 6:
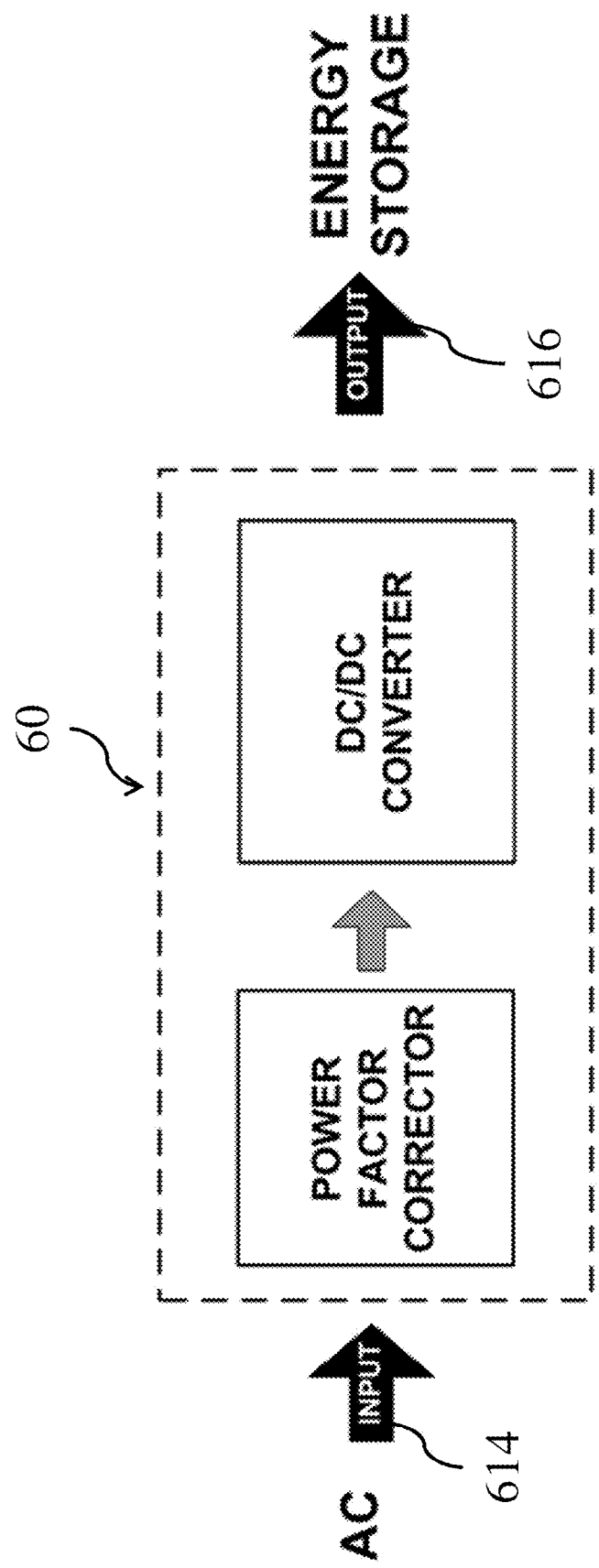
FIG. 6 illustrates a block diagram of an embodiment converter circuit.

FIG. 6 illustrates an embodiment block diagram of a plug-in battery charging station. The system includes input 614 connected to a converter circuit 60 which is further connected to an output 616. In an embodiment, the converter circuit 60 is connected between a plug-in battery charging station, which provides an AC voltage signal to input 614, and a battery connected to output 616. Converter circuit 60 may be similar to embodiments described above and may include a power factor corrector coupled to a voltage converter circuit. In an embodiment, a buck converter includes both such components. According to other embodiments, the converter circuit 60 receives an AC voltage through input 614, corrects and converts the voltage, and supplies output 616 which is connected to an energy storage medium. In a further embodiment, the plug-in battery charging station is designed for electric vehicles and the converter circuit 60 is connected to batteries within an electric vehicle through output 616.

Figure 7:
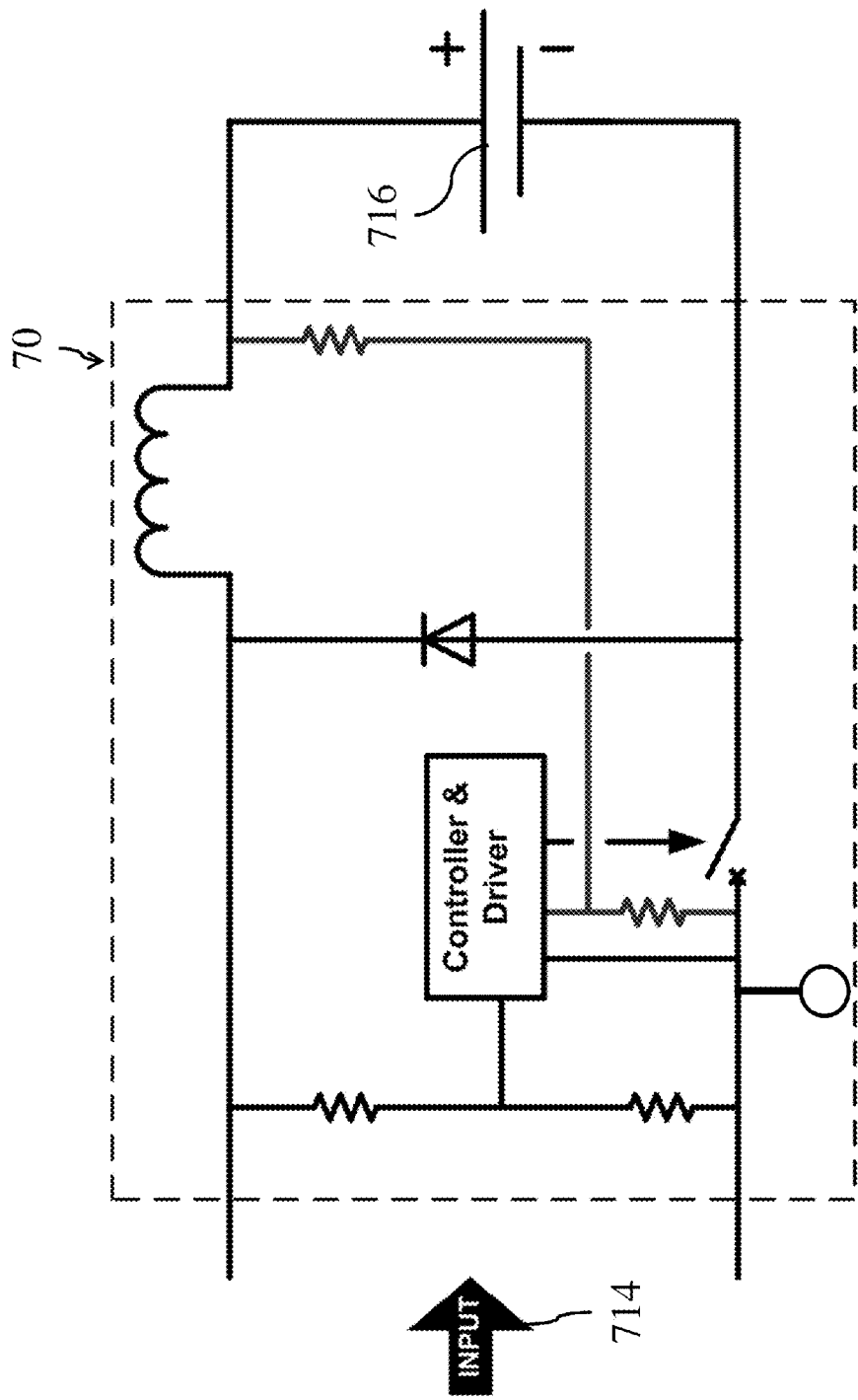
FIG. 7 illustrates a schematic of an embodiment converter circuit.

FIG. 7 illustrates an embodiment converter circuit 70 connected to an energy storage device 716. In various embodiments, energy storage device 716 may include a battery, a stack of batteries, a high voltage battery or stack of batteries for electric vehicles, or other types of energy storage device. Converter circuit 70 may maintain or monitor a voltage or a current supplied to energy storage device 716. Converter circuit 70 includes various embodiments as described herein with reference to other Figures.

Figure 8:
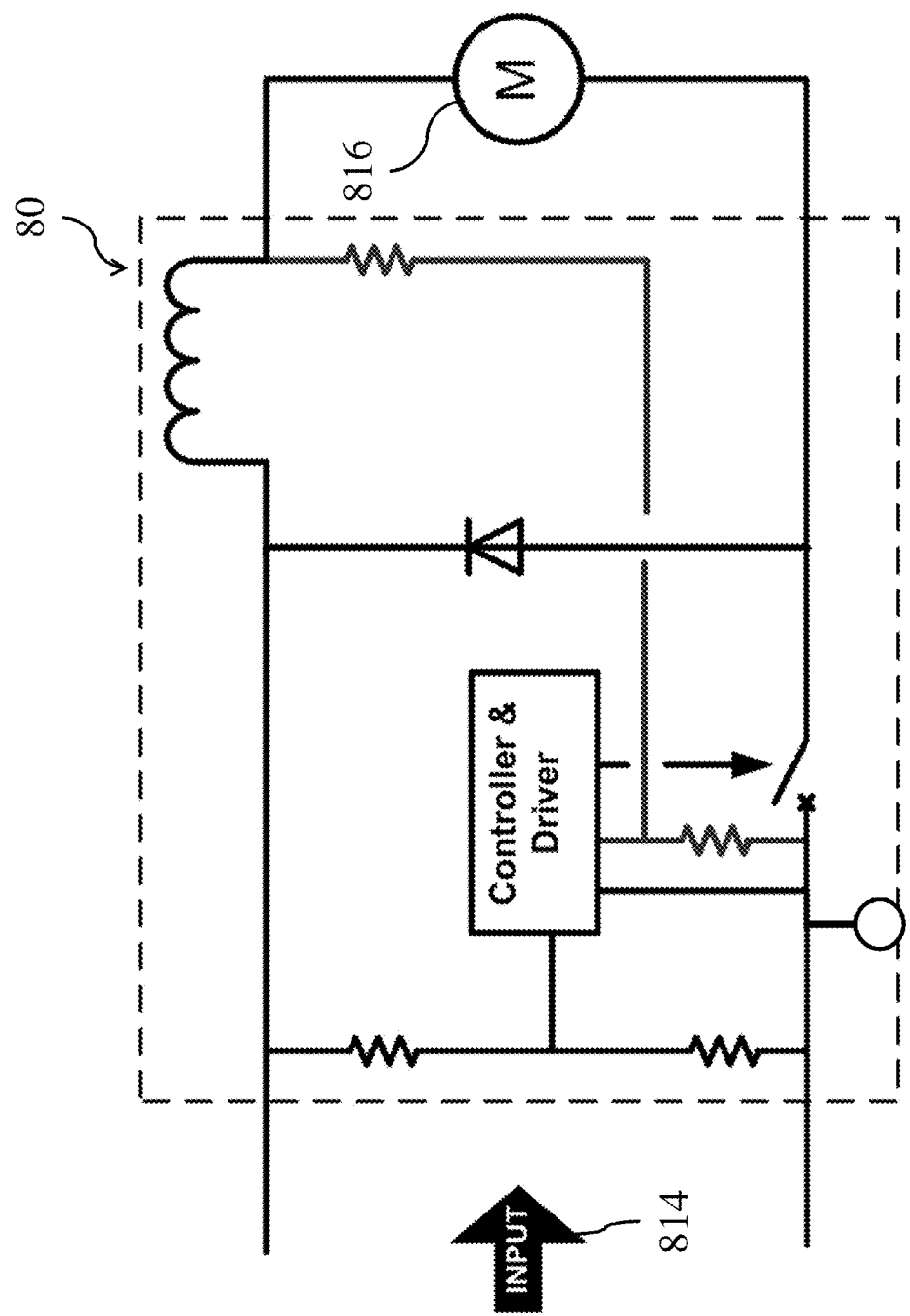
FIG. 8 illustrates a schematic of an embodiment converter circuit.

FIG. 8 illustrates an embodiment converter circuit 80 connected to a motor 816. According to various embodiments, the motor 816 may be any type of motor. In one embodiment, the motor 816 is a pump motor. As described with reference to other embodiments contained herein, converter circuit 80 receives an input voltage or current signal through input 814 and converts the input signal to an output signal which is supplied to motor 816.

Figure 9:
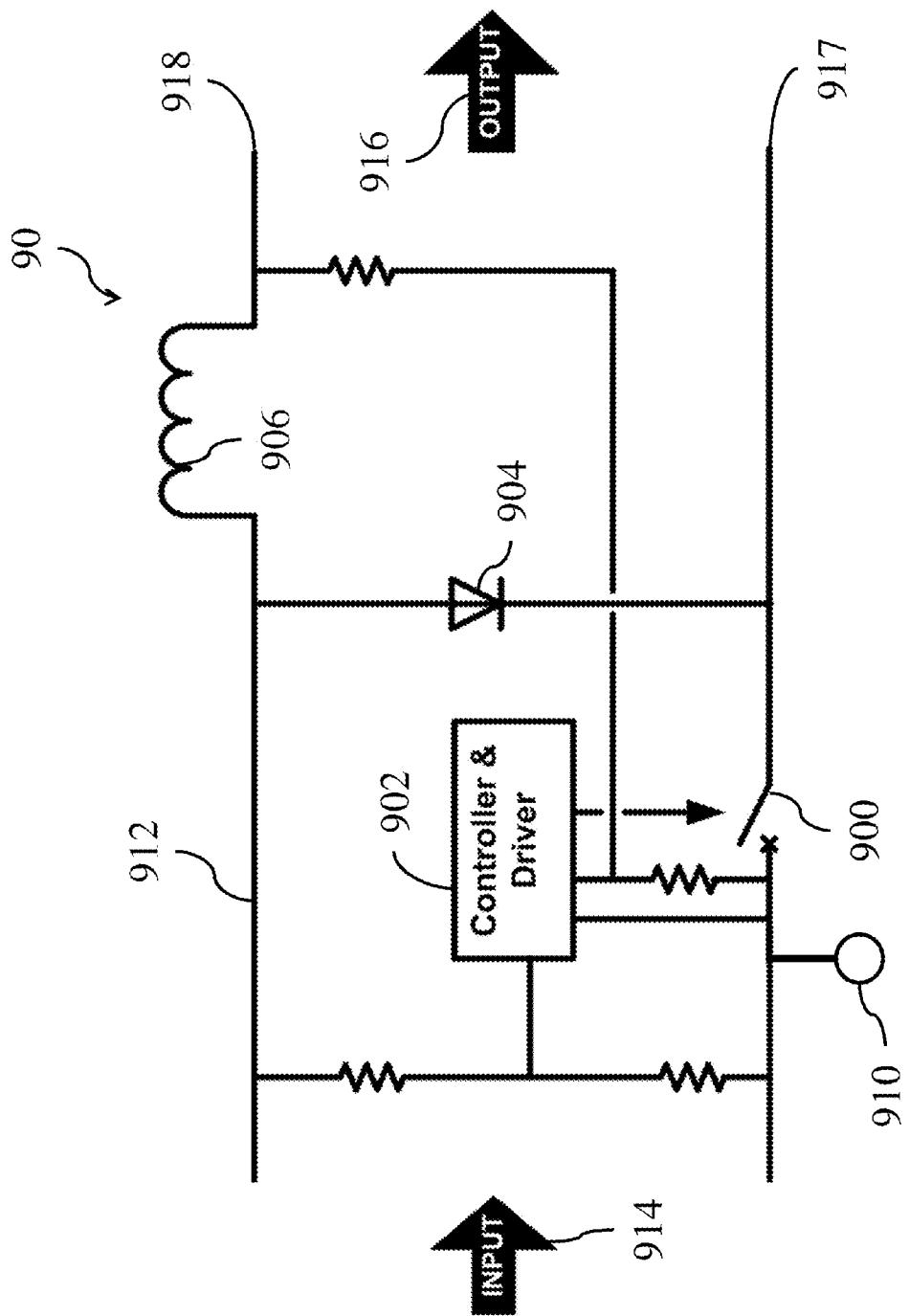
FIG. 9 illustrates a schematic of an embodiment converter circuit.

FIG. 9 illustrates an embodiment converter 90 operating in a negative configuration of converter circuit 20 in FIG. 2. Converter circuit 90 receives a negative input voltage 914 and supplies an output voltage 916. Node 912 is maintained at a negative voltage with respect to the reference node 910 because input voltage 914 is negative. Diode 904 is reversed from other embodiments to accommodate the negative voltage on node 912. When switch 900 is open, current flows through inductor 906, into diode 904 and out an output terminal 917. When switch 900 is closed, current flows from output terminal 918, through inductor 906, into and out of node 912. Current also flows into reference node 910 from the input, through switch 900, and out the output terminal 917. According to various embodiments, operation of controller 902 is similar to that described with reference to other figures contained herein.

Figure 10:
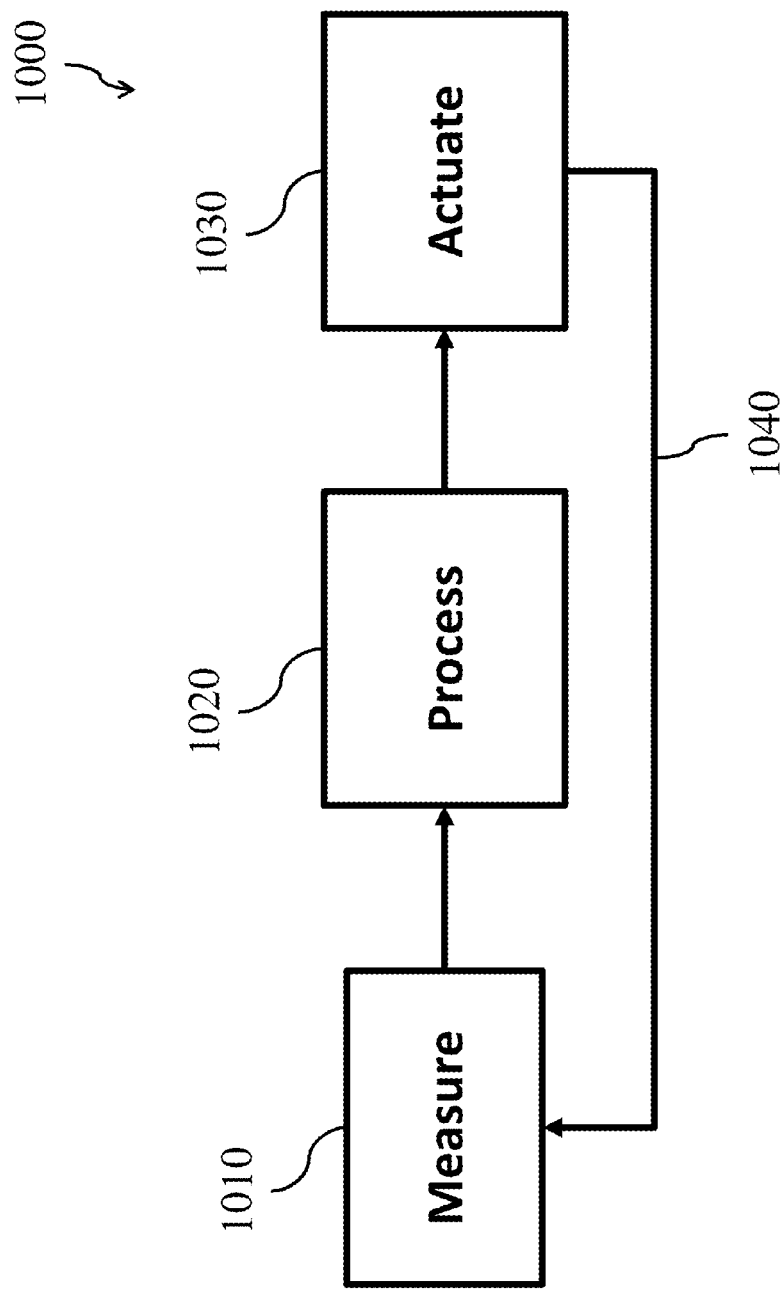
FIG. 10 illustrates a flowchart of an embodiment method of operation.

FIG. 10 illustrates a flowchart depicting an embodiment method of operation 1000 of various converter circuits as described herein. Method of operation 1000 includes a measurement step 1010, a process step 1020, and an actuate step 1030. In various embodiments, measurement step 1010 includes measuring a signal at an output terminal. Measurement step 1010 may include measuring a voltage at an output terminal or measuring a current at an output terminal. According to one embodiment, the voltage is only measured when a switch (e.g. switch 200 in FIG. 2) is closed. Process step 1020 may include determining a switching signal based on the measured signal. In an embodiment, the switching signal is a pulse width modulated (PWM) signal and process step 1020 uses the measured signal to determine a duty cycle for the PWM signal. Process step 1020 may also include determining an error signal by subtracting the measured signal from a reference signal and using the error signal to modify the switching signal. Actuate step 1030 may include applying the switching signal to the switch, which may include applying a PWM signal to the switch. Measure, process, and actuate steps 1010, 1020, and 1030, respectively, may be repeated in numerous cycles as shown by flow path 1040. As the switch is cyclically actuated (opened and closed) according to method of operation 1000, energy may be transferred, through embodiments described herein with reference to the other figures, from an input power source to a load.

As mentioned with reference to FIGS. 4a-4b, the measurement of output voltage may include an error due to a voltage drop across a switch (i.e. switch 200). In some embodiments, a controller (i.e. controller 202) may be configured to correct the measured output voltage by an amount corresponding to the voltage drop across the switch. In various embodiments, the voltage drop is taken directly from a switch (such as a transistor) datasheet. In a specific embodiment of an IGBT, the voltage drop may be taken directly from the datasheet. In other embodiments, the voltage drop across the switch is obtained by determining a product of current through the switch multiplied by the resistance of the switch when the switch is closed. According to embodiments where the switch is implemented with a transistor (described above), the forward on resistance of the specific transistor is used. In equation form, $V_{drop}=I*R_{on}$, where $V_{drop}$ is the voltage drop across the switch, I is the current through the switch, and $R_{on}$ is the resistance of the switch when the switch is conducting.

Figure 11:
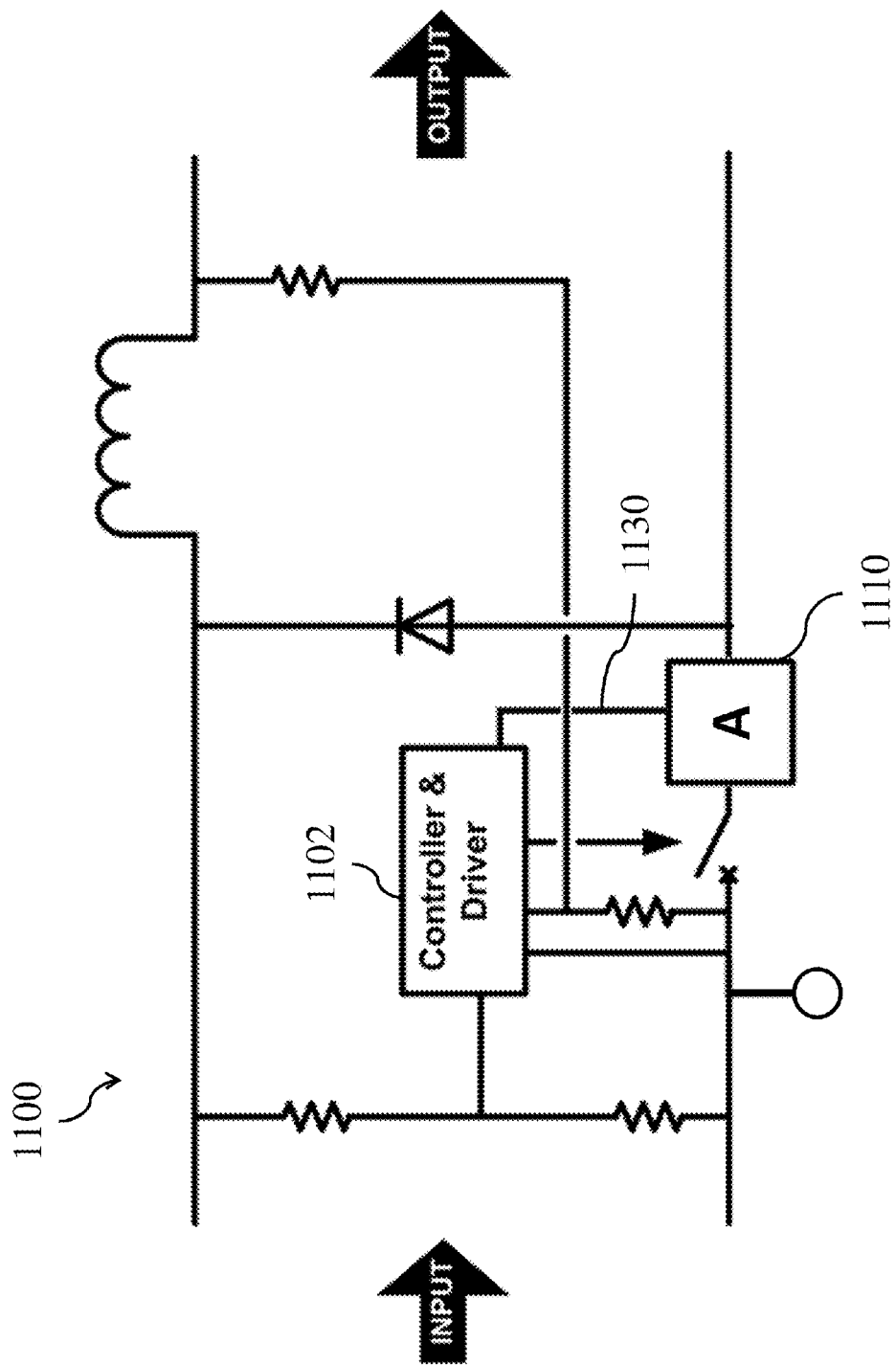
FIG. 11 illustrates a schematic of an embodiment converter circuit.

In some cases, switch resistance $R_{on}$ depends on the type of switch used and may be obtained from the switch datasheet, and current I may be obtained by calculation or by measurement. FIG. 11 illustrates an embodiment converter 1100 with a current measurement device 1110. As shown, current measurement device 1110 provides a current signal to controller 1102 through connection 1130. Current measurement device 1110 may be implemented for example using a Hall Effect current sensor.

Figure 12:
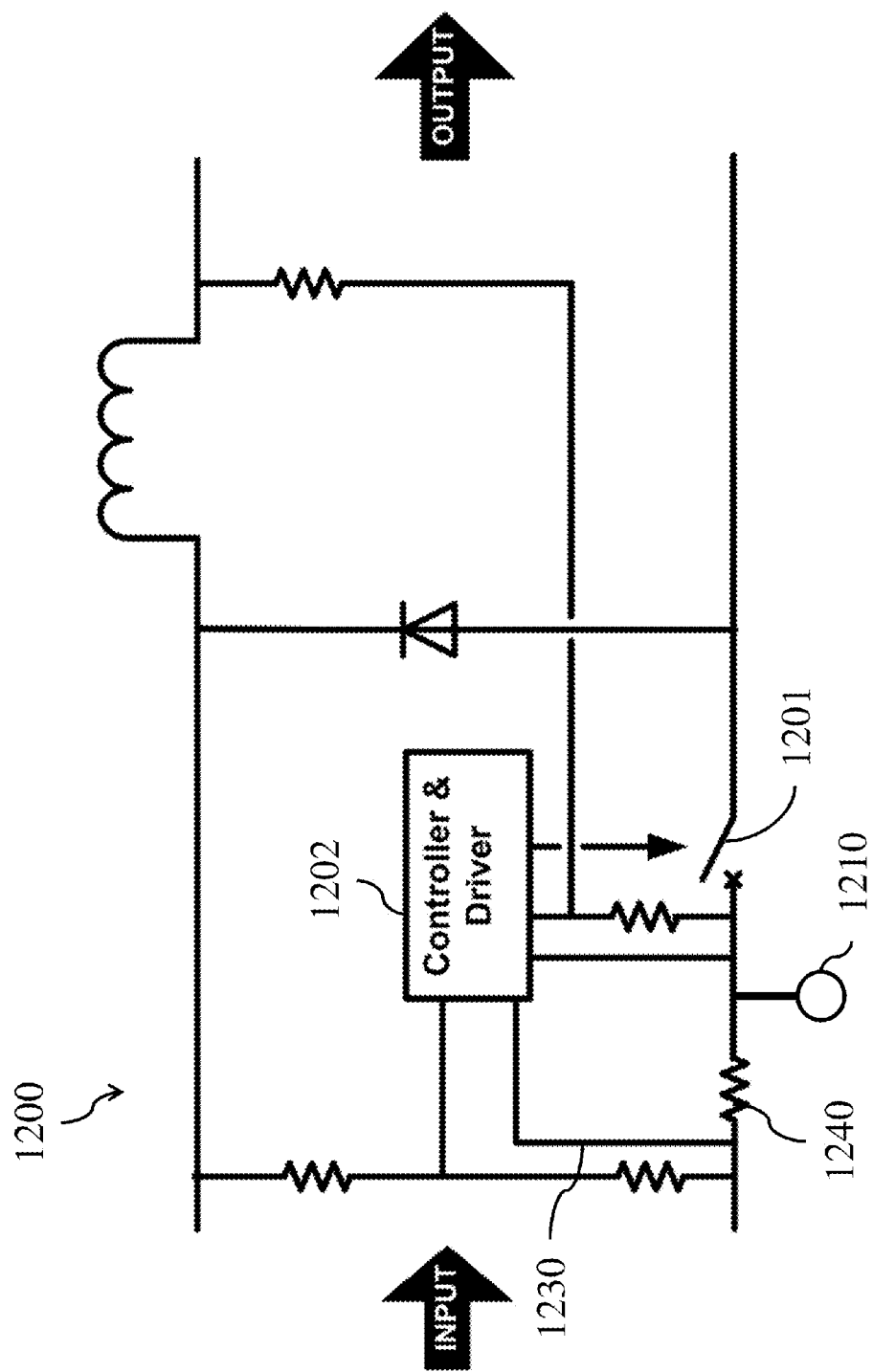
FIG. 12 illustrates a schematic of an embodiment converter circuit.

FIG. 12 illustrates an embodiment converter 1200 in which current measurement device 1110 is implemented by using a small shunt resistor 1240. Shunt resistor 1240 is a known resistance placed in series with switch 1201. Controller 1202 measures the voltage across shunt resistor 1240, for example, by measuring the voltage at node 1230 with respect to reference node 1210. In the embodiment shown, both the controller 1202 and the switch 1201 share reference node 1210. According to an embodiment, the voltage across shunt resistor 1240 may be a small negative voltage. In some embodiments, shunt resistor 1240 may also be placed on the opposite side of switch 1201 and the connection of controller 1202 to node 1230 depicted in FIG. 12 may be modified to measure the voltage drop across shunt resistor 1240 with two connections.

According to embodiments where the current I is calculated, various equations may be used relevant to the type of switch (or transistor) to calculate current I based on circuit voltages. In another embodiment, the current through the switch may be estimated by estimating the current in the inductor using the inductance of the inductor, the voltage of the input, the voltage of the output, and the time the switch is closed. In various embodiments, the current in the inductor $i_{ind}$ is approximately equal to the current in the switch I.

In an embodiment, the current in the inductor may be estimated by solving the inductor equation, $$V_{ind}=L*di_{ind}/dt$$

through integration. Here L is the inductance of the inductor and $V_{ind}$ is the voltage on the inductor. Integrating and solving for the current yields, $$i_{ind} = \int_0^{T_{on}} V_{ind}/L\, dt = \frac{V_{ind}}{L} T_{on}$$

where $T_{on}$ is the time the switch has been closed. In some embodiments, this estimation for $i_{ind}$ may be used to estimate the current I in the switch.

In some embodiments, temperature may be used to more accurately calculate both current I and resistance $R_{on}$. Depending on the device type of the switch (or transistor), both values will have a dependency on temperature which can typically be found in a device datasheet. The temperature of the device may either be estimated or measured with a temperature sensor (not shown). Temperature estimation also depends on the device type and the relationship is typically known for common devices. In many embodiments, the controller (1102 or 202) performs the calculations and may be implemented as described earlier with reference to controller 202.

In some embodiments, the controller may include a memory device, such as one or more look-up tables having data values related to the switch (transistor) type used. According to various embodiments, the look-up table provides values giving an estimate of an output current and/or voltage drop based on inputs to the look-up table such as input voltage, output voltage, inductance, time-on, and/or temperature. The data in the lookup tables may represent the relationship of resistance $R_{on}$ with temperature, current I with temperature, voltage drop $V_{drop}$ with temperature, and/or other relationships.

In accordance with an embodiment, a circuit includes a switch coupled between a first reference terminal and a first output terminal. The circuit also includes an inductive element coupled between an input terminal and a second output terminal, a diode coupled between the first output terminal and the input terminal, and a controller coupled to a control terminal of the switch. According to an embodiment, the controller is configured to determine a switching signal based on an output signal at the second output terminal and provide the switching signal to the control terminal of the switch.

According to various embodiments, the output signal is a voltage at the second output terminal. In some embodiments, the circuit includes a sensing circuit coupled to the second output terminal. The sensing circuit may have a resistive voltage divider coupled between the second output terminal and the first reference terminal, and the controller may also be configured to determine the switching signal based on an output of the resistive voltage divider when the switch is closed.

In various embodiments, determining the switching signals includes correcting the output of the resistive voltage divider by a voltage drop across the switch. In some embodiments, the voltage drop is determined by determining a current through the switch and estimating the voltage drop based on the determined current. The controller may also be configured to determine the switching signal based on a voltage between the second output terminal and the first reference terminal when the switch is closed. In one embodiment, the controller is coupled to the first reference terminal. In some embodiments, the output signal is an output current from the second terminal. In a specific embodiment, the switch may include an IGBT.

The switched-mode power converter includes a switch coupled between a reference terminal and a first output terminal, a diode coupled between an input terminal and the first output terminal, and an inductive element coupled between the input terminal and a second output terminal. In accordance with an embodiment, a method of operating a switched-mode power converter includes measuring a signal at the second output terminal, determining a switching signal based on the measuring, and applying the switching signal to the switch.

In some embodiments, measuring the signal at the second output terminal includes measuring a voltage between the second output terminal and the reference terminal. Measuring the voltage may include measuring the voltage when the switch is closed. In some embodiments, measuring a voltage between the second output terminal and the reference terminal includes correcting the measured voltage by a voltage drop across the switch. In an embodiment, the voltage drop is determined by determining a current through the switch and estimating the voltage drop based on the determined current.

In various embodiments, determining the switching signal includes determining a duty cycle of a pulse width modulated signal. Applying the switching signal may include applying the pulse width modulated signal to the switch. In another embodiment, determining the switching signal includes determining an error signal by subtracting the measured signal from the second output terminal from a reference signal. In some embodiments, the method also includes transferring energy from a first power source coupled to an input terminal to a load coupled between the first output terminal and the second output terminal.

In accordance with an embodiment, a buck converter circuit includes a transistor coupled between a first reference terminal and a first output terminal. The buck converter circuit also includes an inductive element coupled between an input terminal and a second output terminal. The buck converter circuit has a diode coupled between the first output terminal and the input terminal. In the buck converter circuit, a controller is coupled to a control terminal of the transistor and is configured to supply a control signal to the transistor. The control signal may turn on and turn off the transistor. The buck converter circuit may further include an output sensing circuit coupled between the second output terminal and the first reference terminal, and may be coupled to the controller. In the buck converter circuit, the controller and output sensing circuit may be configured to determine an output voltage between the second output terminal and the reference terminal.

According to various embodiments, the controller and output sensing circuit are configured to determine an output voltage between the second output terminal and the reference terminal only when the transistor is turned on. The buck converter circuit may be configured to correct the determined output voltage between the second output terminal and the reference terminal by a voltage drop across the transistor. In some embodiments, the voltage drop is determined by determining a current through the transistor and estimating the voltage drop based on the determined current.

In an embodiment, the control signal includes a pulse width modulated signal. In some embodiments, the buck converter circuit may further include a power source coupled between the input terminal and the reference terminal. The buck converter circuit may also include a load coupled between the second output terminal and the first output terminal. According to one embodiment, the buck converter circuit may be configured to transfer energy from the power source to the load. In another embodiment, the controller may be coupled to the first reference terminal.

Advantages of some embodiments include a reduced system cost because fewer components are needed and the ability of a controller to drive a switch even during high voltage operation of the switch. In some embodiments, the driver and the controller may be combined advantageously into a less costly component.

A further advantage includes the ability of a controller to drive a switch without an isolated driver and/or a floating power supply, thereby reducing system cost. In some embodiments, connecting a switch and a controller to a common reference node prevents the switch from being floating with respect to the controller when the output voltage is being measured. Because the switch is not floating, an isolated driver for driving the switch and/or a floating power supply for driving the switch are not necessary in some cases. A further advantage includes the ability for a controller to easily drive a switch even in the case of high voltage operation.

While the forgoing description has been made with reference to illustrative embodiments, this description is not intended to be construed in a limiting sense. Various modifications and combinations of the illustrative embodiments, as well as other embodiments, will be apparent to persons skilled in the art upon reference to the description. As an illustration, the embodiments described in the figures contained herein may be combined with each other in alternative embodiments. It is therefore intended that the appended claims encompass any such modifications or embodiments.

Although present embodiments and their respective advantages have been described in detail, it should be understood that various changes, substitutions and alterations can be made herein without departing from the spirit and scope of the disclosure as defined by the appended claims. For example, many of the features and functions discussed above can be implemented in multiple types of circuit mediums: discrete, integrated, or a combination thereof. As another example, it will be readily understood by those skilled in the art that many of the features, functions, processes, and materials described herein may be varied while remaining within the scope of the present disclosure.

Moreover, the scope of the present disclosure is not intended to be limited to the particular embodiments of the process, machine, manufacture, composition of matter, means, methods and steps described herein. As one of ordinary skill in the art will readily appreciate, processes, machines, manufacture, compositions of matter, means, methods, or steps, presently existing or later to be developed, that perform substantially the same function or achieve substantially the same result as the corresponding embodiments described herein may be utilized according to the embodiments described herein. Accordingly, the appended claims are intended to include within their scope such processes, machines, manufacture, compositions of matter, means, methods, or steps.

What is claimed is:

1. A circuit comprising:
 a switch coupled between a first reference terminal and a first output terminal, wherein the first output terminal is floating when the switch is open;

an inductive element coupled between an input terminal and a second output terminal;
a diode coupled between the first output terminal and the input terminal;
a controller coupled to a control terminal of the switch, wherein the controller is configured to determine a switching signal based on an output signal at the second output terminal and provide the switching signal to the control terminal of the switch; and
a sensing circuit coupled to the second output terminal, wherein the sensing circuit comprises a resistive voltage divider coupled between the second output terminal and the first reference terminal; and
wherein the controller is further configured to determine the switching signal based on an output of the resistive voltage divider, wherein the switching signal is based on the output of the resistive voltage divider only when the switch is closed.

2. The circuit of claim 1, wherein the output signal is a voltage at the second output terminal.

3. The circuit of claim 1, wherein determining the switching signals includes correcting the output of the resistive voltage divider by a voltage drop across the switch.

4. The circuit of claim 3, wherein the voltage drop is determined by determining a current through the switch and estimating the voltage drop based on the determined current.

5. The circuit of claim 1, wherein the controller is coupled to the first reference terminal.

6. The circuit of claim 1, wherein the output signal is an output current from the second output terminal.

7. The circuit of claim 1, wherein the switch comprises an IGBT.

8. A method of operating a switched-mode power converter comprising a conduction switch coupled between a reference terminal and a first output terminal, a diode coupled between an input terminal and the first output terminal, and an inductive element coupled between the input terminal and a second output terminal, wherein the method comprises:
measuring a signal at the second output terminal, wherein measuring the signal at the second output terminal comprises measuring a voltage between the second output terminal and the reference terminal using a voltage divider coupled to the second output terminal and the reference terminal;
determining a switching signal based on the measuring;
applying the switching signal to the conduction switch;
disconnecting the voltage divider from a controller using a measurement switch when the conduction switch is open; and
connecting the voltage divider to the controller using the measurement switch when the conduction switch is closed.

9. The method of claim 8, wherein measuring the voltage comprises measuring the voltage when the conduction switch is closed.

10. The method of claim 9, wherein measuring a voltage between the second output terminal and the reference terminal includes correcting the measured voltage by a voltage drop across the conduction switch.

11. The method of claim 10, wherein the voltage drop is determined by determining a current through the conduction switch and estimating the voltage drop based on the determined current.

12. The method of claim 8, wherein determining the switching signal comprises determining a duty cycle of a pulse width modulated signal.

13. The method of claim 12, wherein applying the switching signal comprises applying the pulse width modulated signal to the conduction switch.

14. The method of claim 8, wherein determining the switching signal comprises determining an error signal by subtracting the measured signal from the second output terminal from a reference signal.

15. The method of claim 8, further comprising transferring energy from a first power source coupled to an input terminal to a load coupled between the first output terminal and the second output terminal.

16. A buck converter circuit comprising:
a transistor coupled between a reference terminal and a first output terminal;
an inductive element coupled between an input terminal and a second output terminal;
a diode coupled between the first output terminal and the input terminal;
a controller coupled to a control terminal of the transistor and configured to supply a control signal to the transistor operable to turn on and turn off the transistor; and
an output sensing circuit coupled between the second output terminal and the reference terminal, and to the controller, wherein the controller and output sensing circuit are configured to determine an output voltage between the second output terminal and the reference terminal only when the transistor is turned on.

17. The buck converter circuit of claim 16, further configured to correct the determined output voltage between the second output terminal and the reference terminal by a voltage drop across the transistor.

18. The buck converter circuit of claim 17, wherein the voltage drop is determined by determining a current through the transistor and estimating the voltage drop based on the determined current.

19. The buck converter circuit of claim 16, wherein the control signal comprises a pulse width modulated signal.

20. The buck converter circuit of claim 16, further comprising:
a power source coupled between the input terminal and the reference terminal; and
a load coupled between the second output terminal and the first output terminal, wherein the buck converter circuit is configured to transfer energy from the power source to the load.

21. The buck converter circuit of claim 16, wherein the controller is coupled to the reference terminal.

22. The circuit of claim 5, wherein the first reference terminal comprises a ground node.

23. The circuit of claim 1, further comprising a measurement switch coupling the output of the resistive voltage divider to the controller, wherein the measurement switch is configured to be closed when the switch is closed and open when the switch is open.

24. The buck converter circuit of claim 16, further comprising a measurement switch coupling the output sensing circuit to the controller, wherein the measurement switch is configured to be closed when the transistor is turned on and open when the transistor is turned off.

* * * * *